(12) United States Patent
West et al.

(10) Patent No.: US 10,474,549 B2
(45) Date of Patent: Nov. 12, 2019

(54) SYSTEM RECOVERY USING A FAILOVER PROCESSOR

(71) Applicant: Oracle International Corporation, Redwood Shores, CA (US)

(72) Inventors: Christopher West, Longmont, CO (US); James Baer, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 15/665,343

(22) Filed: Jul. 31, 2017

(65) Prior Publication Data

US 2019/0034301 A1   Jan. 31, 2019

(51) Int. Cl.
| | |
|---|---|
| *G06F 11/00* | (2006.01) |
| *G06F 11/20* | (2006.01) |
| *G06F 9/38* | (2018.01) |
| *G06F 11/16* | (2006.01) |
| *G06F 11/18* | (2006.01) |

(52) U.S. Cl.
CPC ........ *G06F 11/2035* (2013.01); *G06F 9/3861* (2013.01); *G06F 9/3877* (2013.01); *G06F 11/1658* (2013.01); *G06F 11/1687* (2013.01); *G06F 11/184* (2013.01); *G06F 2201/85* (2013.01)

(58) Field of Classification Search
CPC ............. G06F 11/1658; G06F 11/1687; G06F 11/184; G06F 11/3404
See application file for complete search history.

(56) References Cited

U.S. PATENT DOCUMENTS

| | | | | |
|---|---|---|---|---|
| 2005/0246581 A1* | 11/2005 | Jardine | ..................... | G06F 9/52 714/12 |
| 2014/0298480 A1* | 10/2014 | Gallet | ................... | G06F 1/3203 726/26 |
| 2015/0355700 A1* | 12/2015 | Pusukuri | ................. | G06F 1/329 713/323 |

* cited by examiner

*Primary Examiner* — Charles Ehne
(74) *Attorney, Agent, or Firm* — Invoke

(57) ABSTRACT

Techniques for system recovery using a failover processor are disclosed. A first processor, with a first instruction set, is configured to execute operations of a first type; and a second processor, with a second instruction set different from the first instruction set, is configured to execute operations of a second type. A determination is made that the second processor has failed to execute at least one operation of the second type within a particular period of time. Responsive to determining that the second processor has failed to execute at least one operation of the second type within the particular period of time, the first processor is configured to execute both the operations of the first type and the operations of the second type.

18 Claims, 9 Drawing Sheets

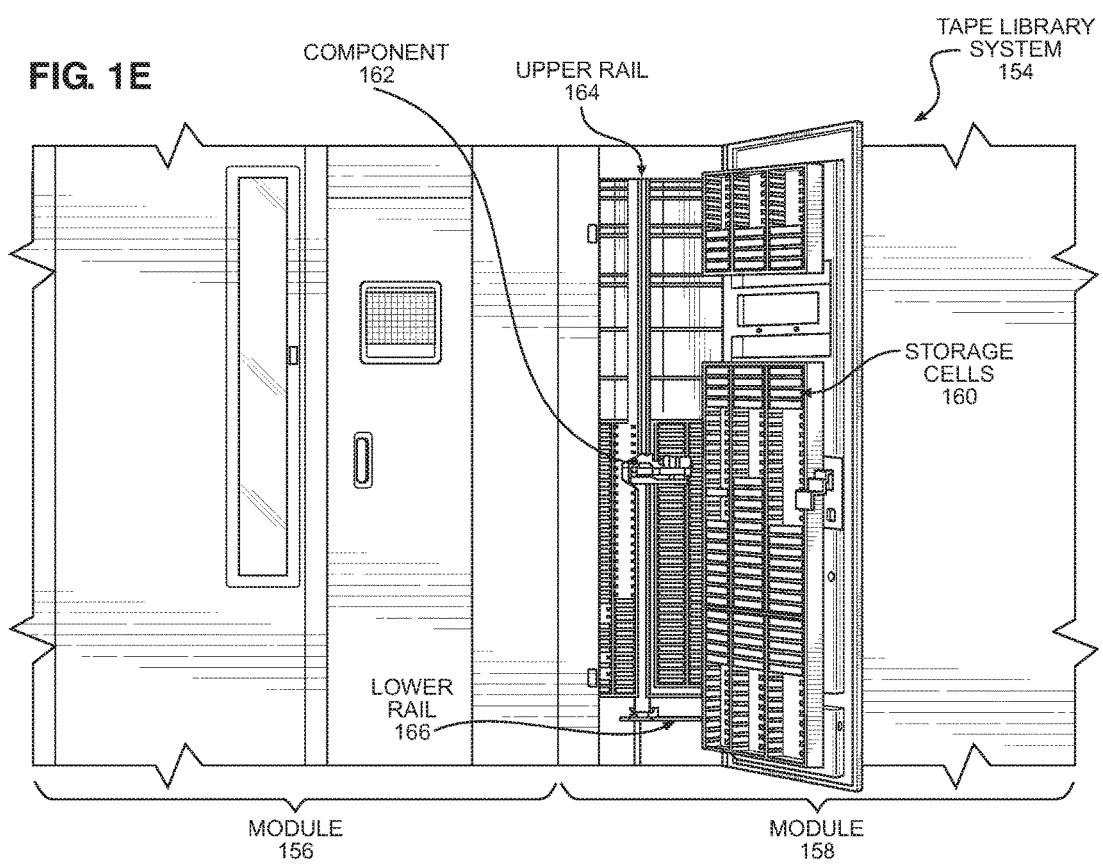

SYSTEM RECOVERY USING A FAILOVER PROCESSOR

TECHNICAL FIELD

The present disclosure relates to system recovery. In particular, the present disclosure relates to system recovery in a system with more than one processor.

BACKGROUND

Computer systems are used to perform many different types of operations. A computer system relies on at least one processor, as described in further detail below. Each processor has an associated instruction set, i.e., a set of instructions that the processor is able to understand and execute natively. A given instruction set may include instructions for data handling, memory operations, arithmetic and logic operations, and control flow operations (e.g., branching, conditional logic, and calling other code). An instruction set may also include instructions for communicating with a coprocessor. A coprocessor is another processor, which may have a different instruction set, that supplies functionality in addition to the functionality of a primary processor. If a processor in a computer system fails, the entire computer system may be rendered inoperable. If the computer system has multiple processors and/or coprocessors, functionality supplied by the failed processor may no longer be available. Thus, even if the computer system as a whole remains operable, the failure of the processor may effectively render the computer system inoperable for its intended purpose.

Some systems with mechanical components use servomechanisms. A servomechanism (or "servo" for short) is a device or system that receives feedback and adjusts the operation of one or more physical components based on the feedback received. For example, based on feedback received by a servomechanism, the velocity, position, direction, or other operational property of a component may be adjusted. The adjustments are made automatically (i.e., through operation of the servomechanism itself), not manually by a human operator. For example, a human applying pressure to a brake pedal, to decrease the velocity of an automobile, is not a servomechanism. However, the brake pedal may be connected to an antilock braking system that uses a servomechanism to receive feedback (e.g., rotational velocity of the braking tires) and adjusts operation of the braking system accordingly (e.g., by releasing brake pressure to prevent the vehicle from skidding, if the tires stop rotating suddenly).

Many different types of feedback may be used in a servomechanism. For example, for position-based servomechanisms, the physical location of a component may be monitored and compared with an expected location. If there is a difference between the actual location and the expected location, a component may be slowed down or accelerated to compensate for the difference. Similarly, a mechanical governor, also known as a speed limiter, may be used to compare the actual speed of a component with an expected speed and adjust the actual speed accordingly. Servomechanisms also may be used in robotics to control the velocity, position, direction, or other operational property of a robotic component. Those skilled in the art will appreciate that many different types of servomechanisms exist that rely on many different types of feedback.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1E is an illustration of a tape library system in accordance with one embodiment;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW AND EXAMPLES
3. SYSTEM RECOVERY USING A FAILOVER PROCESSOR
4. ILLUSTRATIVE EXAMPLE
5. MISCELLANEOUS; EXTENSIONS
6. HARDWARE OVERVIEW
7. COMPUTER NETWORKS AND CLOUD NETWORKS

1. General Overview

In one embodiment, a first processor, with a first instruction set, is configured to execute operations of a first type; and a second processor, with a second instruction set different from the first instruction set, is configured to execute operations of a second type. The second processor fails to execute at least one operation of the second type within a particular period of time. Responsive to determining that the failure has occurred, the first processor is configured to execute both the operations of the first type and the operations of the second type.

One or more embodiments described in this Specification and/or recited in the claims may not be included in this General Overview section.

2. Architectural Overview and Examples

Figure 1A:
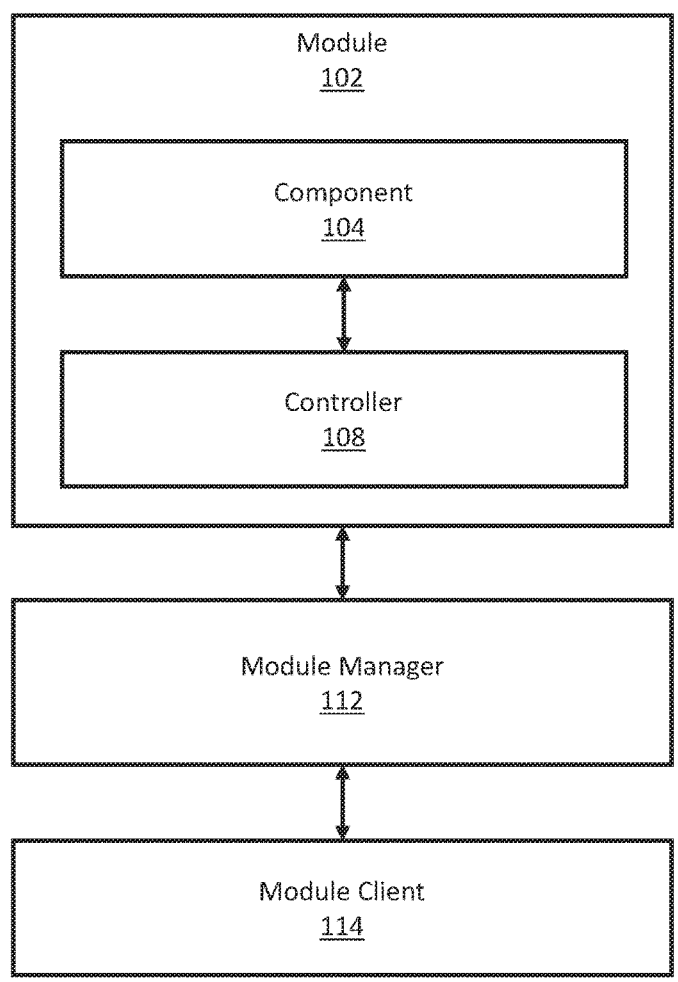
FIG. 1A is a block diagram illustrating a system in accordance with one embodiment.

FIG. 1A illustrates a system 100 in accordance with one or more embodiments. As illustrated in FIG. 1A, system 100 includes a module 102 that includes a component 104 and a corresponding controller 108. The system 100 also includes a module manager 112 and a module client 114. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 6, titled "Computer Networks and Cloud Networks."

In one embodiment, the module 102 is a physical unit that includes (i.e., physically within or via a physical connection) at least one component 104. The component 104 is a physical device, the operation of which is adjustable by a servomechanism (not shown). For example, the module 102 may be a vending machine, an industrial machine (e.g., operating in a production line, farm, or warehouse), a printer (e.g., an ink printer, laser printer, or 3-dimensional printer), a medical or scientific device (e.g., an automated pill sorter or substrate mixer), a vehicle (e.g., a railway car or self-driving automobile), an entertainment device (e.g., an amusement park ride or arcade machine), a household device (e.g., a vacuum cleaner or kitchen appliance), a digital storage device (e.g., a hard drive or storage library), a network switch, or any other kind of physical unit in which the operation of a component 104 is adjustable by a servomechanism. Those skilled in the art will appreciate that the foregoing list is not exhaustive and is provided merely by way of example.

While FIG. 1A illustrates only one component 104, the module 102 may include more than one component. For example, as discussed below, a storage library may include multiple robotic arms handling the storage devices managed by the storage library. Many different types of modules that include multiple components exist. Further, the module 104 may be combined with other modules (not shown), and/or the module 104 may be a combination of multiple sub-modules. For example, a storage library may include more than one inter-compatible storage library modules.

In one embodiment, the controller 108 is a digital device that helps control operation of the component 104. Specifically, the controller 108 may be configured to apply electrical signals to the component 104, to control the velocity, position, direction, and/or other operational properties of the component 104. If the module 102 includes multiple components, each component may be associated with a separate controller. Alternatively or in addition, multiple components may be associated with the same controller, and/or a single component may be associated with multiple controllers.

In one embodiment, the controller 108 is configured to perform servomechanism operations for the component 104. Specifically, the controller 108 may be configured to receive feedback associated with the component 104 and, based on the feedback, adjust operation of the component 104. The controller 108 may adjust operation of the component 104 by applying new electrical signals to the component 104 and/or modifying electrical signals that are already being applied to the component 104.

In one embodiment, the controller 108 is directly coupled to the component 104 in a manner that causes the controller 108 to physically move with the component 104. For example, a controller for a robotic arm may be directly connected to the arm itself, so that when the arm moves, the controller is carried along with it. Alternatively, the controller 108 may be remotely coupled to the component 104 (e.g., through a network cable) so that the controller 108 does not move with the component 104.

In one embodiment, the module manager 112 is configured to manage operation of the module 102. Specifically, the module manager 112 may issue instructions to the controller 108, which in turn controls operation of the component 104 based on those instructions. For example, in storage library where the component 104 is a robotic arm, the module manager 112 may issue instructions to the controller 108 to remove a particular storage device. Based on those instructions, the controller 108 may apply electrical signals to the component 104 (i.e., the robotic arm in this example) so that the component 104 moves to the location of the storage device in the module 102 and removes the storage device. While the module manager 112 is shown in FIG. 1A as being separate from the module 102, the module manager 112 may itself be a component of the module 102. For example, if the module 102 is a storage library, the module manager 112 may be a server housed in the storage library enclosure.

In one embodiment, the module manager 112 receives instructions from a module client 114. Specifically, the module client 114 may be a computing device operating separately from the module 102 and module manager 112, for which the module 102 provides services. The module client 112 may be a web server or host, such as a server providing cloud-based services for multiple tenants (not shown). Accordingly, the module client 114 may have clients of its own, corresponding to the various tenants. In this example, the module 102 is part of the underlying infrastructure providing cloud-based services for the tenants. Cloud networks are discussed in further detail below. Alternatively or in addition, a module client 114 may be a tenant system or some other type of end user of the module 102. Further, the system 100 may include multiple module managers, and/or the system 100 may include multiple module clients communicatively coupled with each module manager.

In one embodiment, elements of the system 100, such as the controller 108, module manager 112, and/or module client 114, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
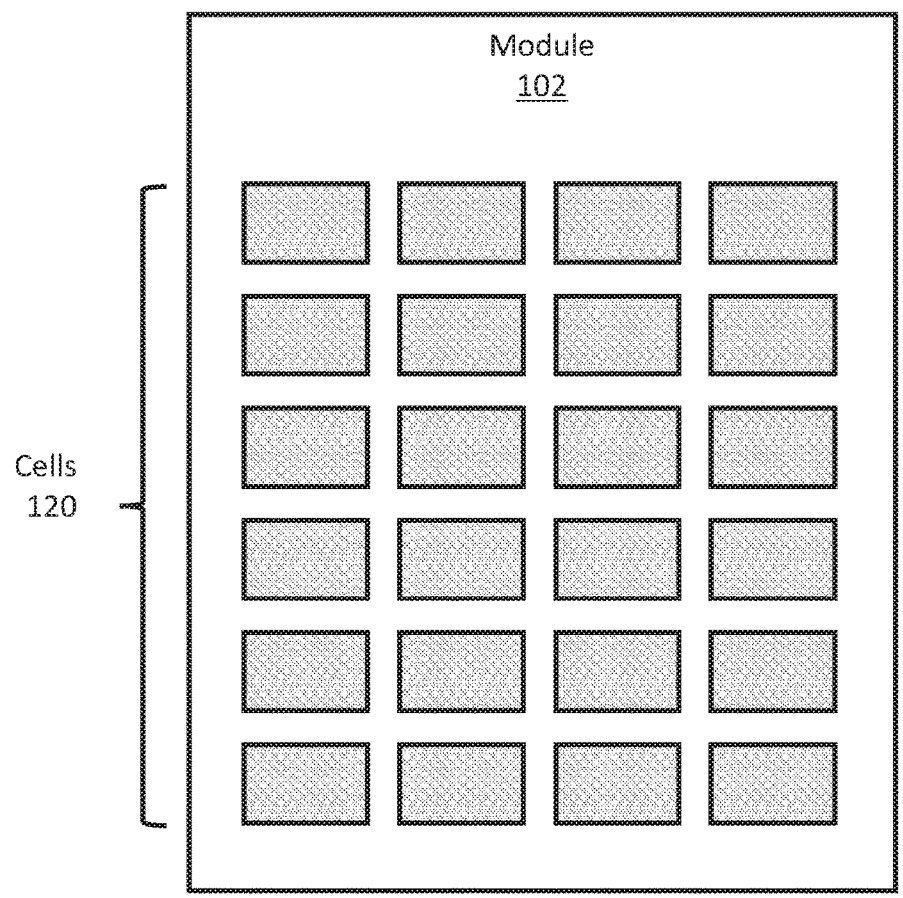
FIGS. 1B and 1C are block diagrams illustrating a module in accordance with one embodiment.

FIG. 1B is a block diagram illustrating a module 102 in accordance with one embodiment. Specifically, FIG. 1B illustrates an abstracted cross-section of a module 102 in accordance with one embodiment. The module 102 includes multiple cells 120 on which components (not shown in FIG. 1B) of the module 102 are configured to operate. In general, referring to FIG. 1B, the term "cells" may refer to a set of similar physical locations in the module 102. For example, if the module 102 is a vending machine, the cells 120 may be so-called "columns" corresponding to particular product selections. If the module 102 is a storage library, the cells 120 may be slots into which storage media (e.g., drives, disks, cartridges, etc.) are inserted. If the module 102 is a network switch, the cells 120 may be physical ports into which cables are inserted. The cells 120 may not be all of the same type. For example, in a storage library, some of the cells 120 may be general-purpose storage cells accepting different types of storage media, while others of the cells 120 may be specific types of storage cells accepting only a particular type of storage media, such as tape cartridges. Many different types of modules exist having different kinds of cells.

In one embodiment, the module 102 includes components in addition to cells or other than cells. In general, the module 102 may include many different types of electronic components, such as a power supply, network connection, sensors, display, storage device, service port, and/or any other type of appropriate electronic component depending on the specific type of module 102.

Figure 1C:
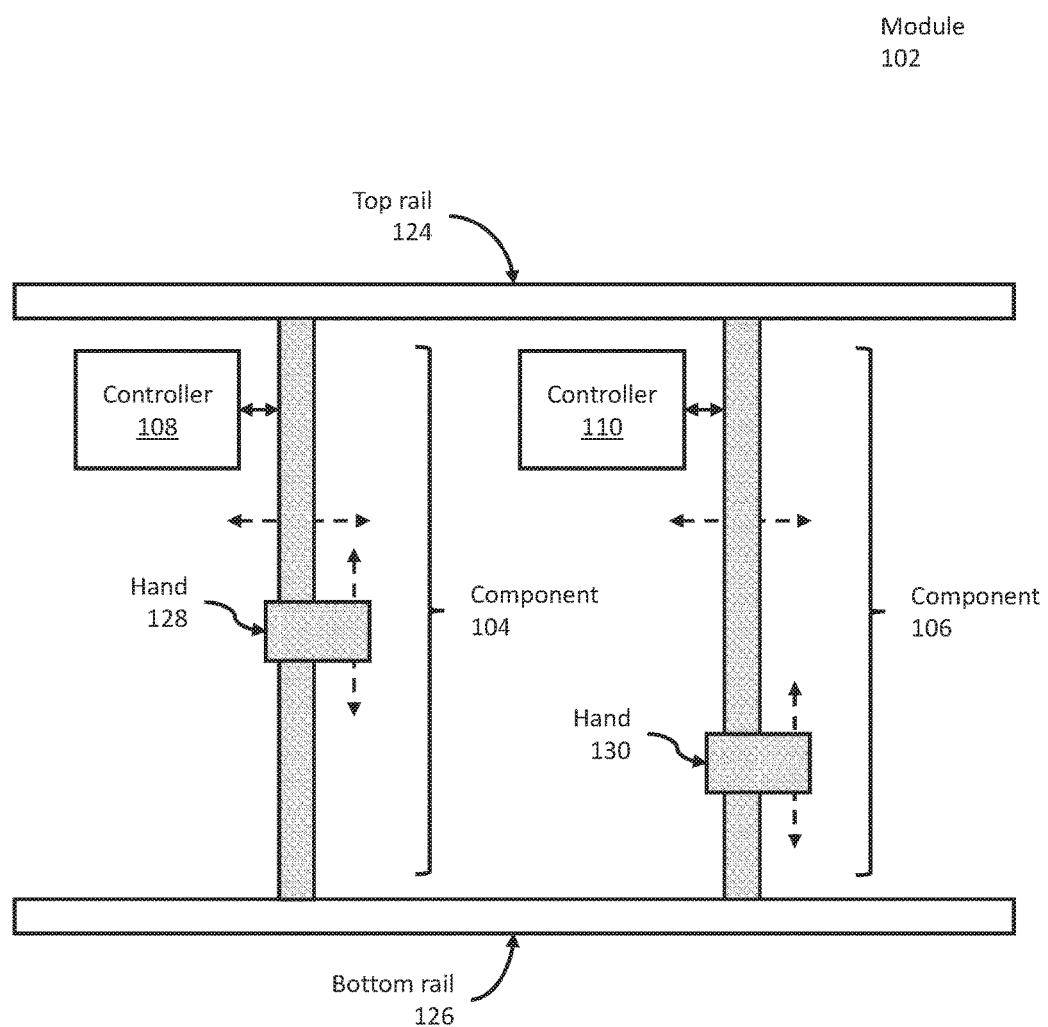

For example, FIG. 1C is a block diagram illustrating a module 102 in accordance with one embodiment. As illustrated in FIG. 1C, the module 102 includes two components 104, 106 operating along a top rail 124 and a bottom rail 126. As used here, the terms "top" and "bottom" are used to differentiate between the rails and may not accurately denote the vertical configuration of the top rail 124 and bottom rail 126 relative to each other. For example, the top rail 124 and bottom rail 126 may be on a same horizontal plane as each other, with FIG. 1C representing an overhead view of the module 102. Many different physical rail configurations may be used. Further, the module 102 may not include any rails, may include more than two rails, or may include only a single rail.

In one embodiment, component 104 has a hand 128 and component 106 has a hand 130. The hands 128, 130 are physical mechanisms used to manipulate other components and/or items in the module 102. For example, the hands 128, 130 may be used to manipulate items placed in cells in the module 102, such as the cells 120 illustrated in FIG. 1B. In one embodiment, the components 104, 106 are configured to follow one axis (e.g., horizontally) along the top rail 124 and bottom rail 126, while the hands 128, 130 are configured to follow another axis (e.g., vertically) along the components 104, 106. In this manner, the hands 128, 130 may be able to reach many different locations within the module 102. Further, if the module 102 has more than one rail, a component may have more than one motor (not shown), with each motor affecting movement of the component along the corresponding rail.

In one embodiment, each of the components 104, 106 has a corresponding controller 108, 110. Each controller is configured to apply electrical signals to its corresponding component, to control movement of the component within the module 102. As illustrated in FIG. 1C, each controller 108, 110 may be directly connected to its corresponding component 104, 106, so that when the component travels along the top rail 124 and bottom rail 126, the corresponding controller moves along with it. Alternatively, one or more of the controllers 108, 110 may be remotely connected to its corresponding component, so the controller does not move with the component.

Figure 1D:
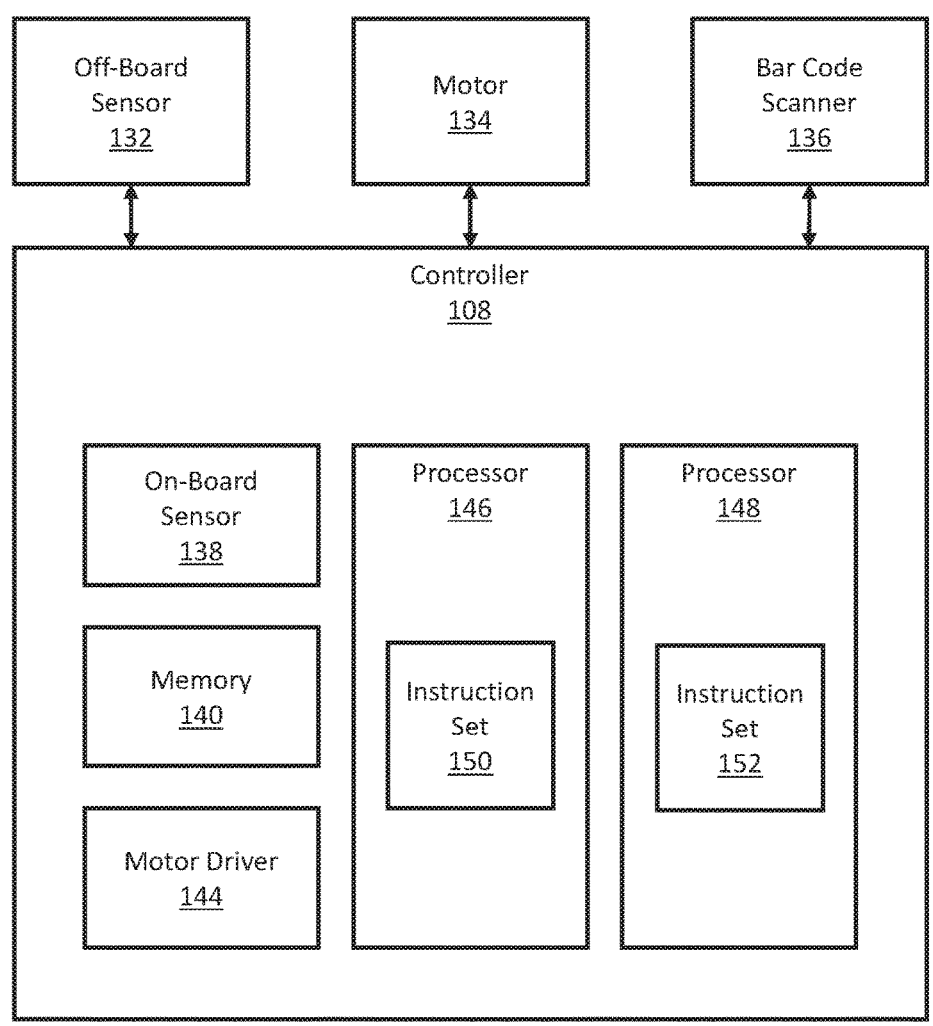
FIG. 1D is a block diagram illustrating a controller in accordance with one embodiment.

FIG. 1D is a block diagram illustrating a controller 108 in accordance with one or more embodiments. The controller 108 is configured to control the operation of a component (not shown) in a module (not shown). The controller 108 may be a logic board, server, or any other type of computing structure or device suitable to perform controller operations described herein.

In one embodiment, the controller 108 includes one or more processors. As illustrated in FIG. 1D, the controller 108 includes two processors; processor 146 and processor 148. Each processor 146, 148 operates using a corresponding instruction set. Specifically, processor 146 uses instruction set 150, and processor 148 uses instruction set 152. The processors 146, 148 may be of the same type or may be of different types. For example, processor 146 may use a general purpose instruction set 150 and processor 148 may use a specialized instruction set 152. In one embodiment, the specialized instruction set 152 includes floating point operations that allow processor 148 to perform mathematical functions for a servomechanism more rapidly than processor 146 would be able to perform those same mathematical functions using the general purpose instruction set 150. For example, a general-purpose processor may be an Advanced RISC Machines (ARM) processor based on the Reduced Instruction Set Computer (RISC) design and the other processor may be a Digital Signal Processing (DSP) processor optimized for digital signal processing including floating point operations. Specifically, the DSP processor may be optimized for measuring, filtering, and/or compressing digital or analog signals, which may involve performing complex mathematical calculations. Performing those calculations quickly may help avoid performance concerns associated with latency and/or offload mathematical calculations from the general purpose processor. The DSP processor may also include fewer transistors and/or use less power than the general-purpose processor. In one embodiment, a general-purpose processor executes instructions relating to high-level commands and general system operations, while a specialized processor handles complex mathematical functions.

In one embodiment, the controller 108 also includes one or more non-transitory computer readable media, such as memory 140 and/or some other type of medium, for storing instructions and/or data used by the one or more processors 146, 148 to perform servomechanism operations. The one or more computer readable media may include executable instructions corresponding to one or more operating systems used by the processor(s), such as a LINUX operating system and/or a reduced kernel of an operating system.

In one embodiment, the controller 108 receives feedback about the operation of the component. The feedback may be used as input to servomechanism operations. For example, the controller 108 may receive feedback from one or more off-board sensors 132. As used here, the term "off-board" means that an off-board sensor 132 is communicatively coupled with the controller 108 but is not part of the controller 108 itself. For example, the off-board sensor 132 may be a sensor physically attached or communicating with the component, such as a thermometer, tachometer, tilt sensor, current sensor, or any other kind of sensor configured to receive feedback about the operation of the component and provide the feedback to the controller 108.

Alternatively or in addition, the controller 108 may include one or more on-board sensors 138. As used here, the term "on-board" means that the on-board sensor 138 is part of the controller 108 itself. For example, if the controller 108 is a logic board, the on-board sensor 138 may be attached to the same logic board. The on-board sensor 138 may be a thermometer, tachometer, tilt sensor, current sensor, or any other kind of sensor configured to receive feedback about the operation of the component.

In one embodiment, the controller 108 is configured to apply electrical signals to the component, to modify the component's operation. For example, the controller 108 may include a motor driver 144 configured to transmit electrical signals to a motor 134 that causes the component to move. The particular electrical signals transmitted from the motor driver 144 to the motor 134 may help determine how the component moves (i.e., direction, speed, etc.). Further, the component may include more than one motor 134, and a combination of electrical signals to the various motors may help determine how the component moves. A motor driver 144 may be configured to transmit electrical signals to a single motor 134, or to multiple motors. For a component with more than one motor (for example, a component operating along more than one rail), more than one motor driver may be used.

In one embodiment, the controller 108 is configured to control and receive feedback from various parts of the component, some of which may not be related to servomechanism operations. For example, the controller 108 may be configured to transmit electrical signals to, and receive electrical signals from, a bar code scanner 136. The bar code scanner 136 may be configured to read bar codes of items manipulated by the component within a module. For example, a hand 128 as illustrated in FIG. 1C may include a bar code reader. The bar code reader may be used to identify items stored in cells 120 as illustrated in FIG. 1B.

FIG. 1E is an illustration of a tape library system 154 in accordance with one embodiment. In this example, the tape library system 154 includes two modules: module 156 and module 158. The modules are connected along a vertical edge to form a single, modular unit. An upper rail 164 and lower rail 166 run the horizontal length of the tape library system 154, allowing a component 162 to access storage cells 160. Each of the storage cells 160 may be configured to accept tape drives and/or other storage media, as discussed above. In FIG. 1E, the storage cells 160 run the length of the tape library system 154 in both the front and back. The component 162 is a robot arm connected to the upper rail 164 and lower rail 166, allowing the component 162 to move along the rail under power of one or more motors. The component 162 also includes a robot hand, which moves vertically along the robot arm to access storage cells 160 at different heights in the tape library system 154. In one embodiment, the tape library system 154 includes more than one robot arm (not shown).

3. System Recovery Using a Failover Processor

Figure 2A:
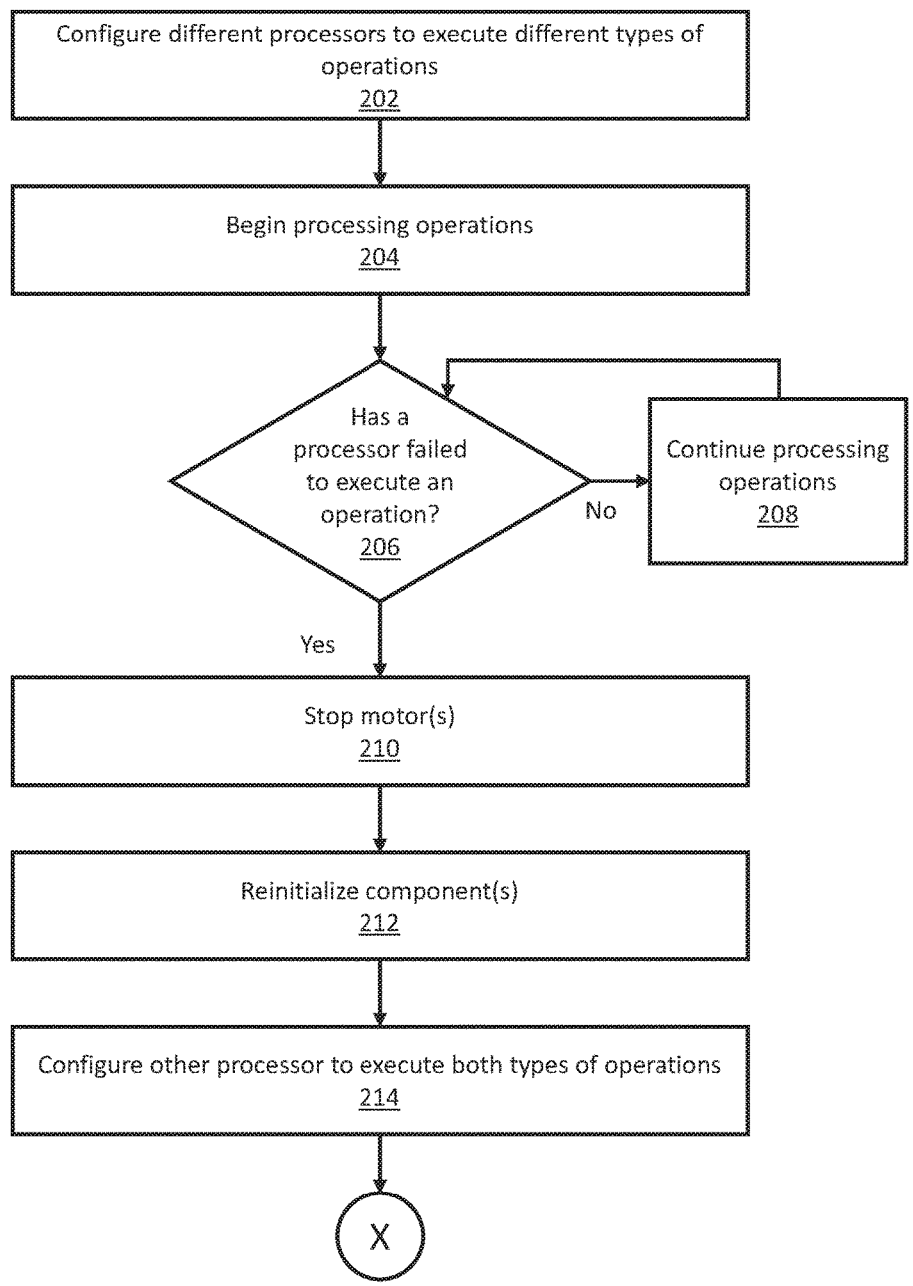
FIGS. 2A and 2B illustrate a set of operations for system recovery using a failover processor in accordance with one embodiment.
Figure 2B:
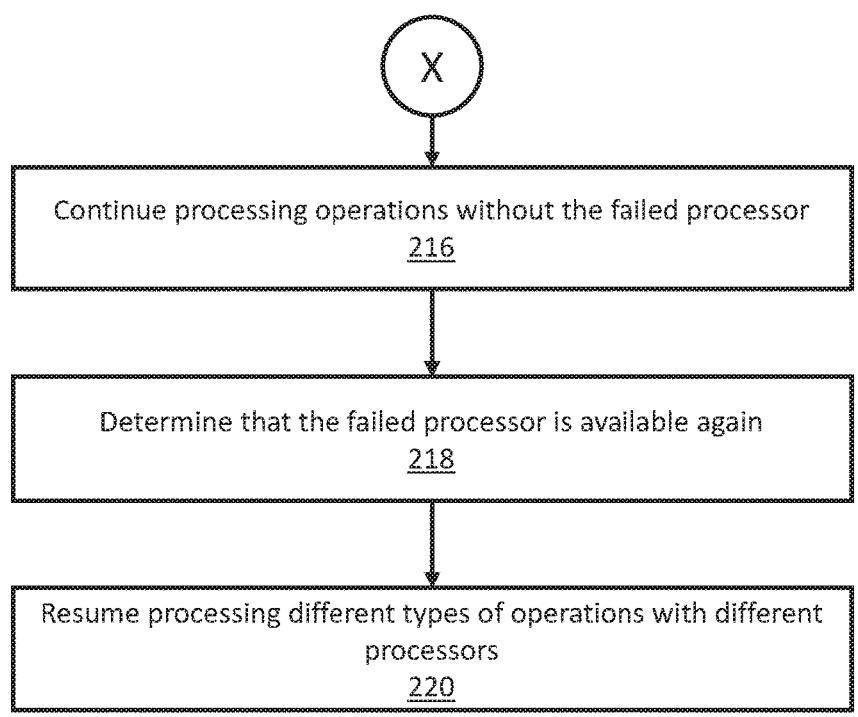

FIGS. 2A and 2B illustrate an example set of operations for system recovery using a failover processor in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments. Further, the following discussion refers to system recovery involving a controller having two processors. However, embodiments may involve any time of computing device having two different processors, where one of the processors can be used as a failover processor. Accordingly, embodiments should not be construed as limited to only controllers.

In one embodiment, a controller has two or more different processors. For purposes of this discussion, the two processors are referred to as (a) a general-purpose processor using a general-purpose instruction set and (b) a DSP processor using a specialized instruction set. General-purpose and specialized instruction sets are discussed in further detail above. However, different types of processors and/or different types of instruction sets may be used.

In one embodiment, the two processors are configured to execute different types of operations (Operation 202). For example, the general-purpose processor may be configured to identify operations for which the DSP processor's instruction set is specialized (e.g., floating-point operations) and forward those operations to the DSP processor for execution. The general-purpose processor may be configured to execute some or all of the remaining operations, for which the DSP processor is not specialized, using the general-purpose instruction set.

In one embodiment, the two processors being processing operations (Operation 204). Processing operations may proceed as follows. The general-purpose processor receives requests to execute operations. Some of the operations may be operations for which the DSP processor's instruction set is specialized, and other operations may be operations for which the DSP processor's instruction set is not specialized. The general-purpose processor identifies which operations to forward to the DSP processor for execution, and the general-purpose processor executes the remaining operations. The specific operations to forward to the DSP processor may be based on a table or other data structure that the general-purpose processor references. The general-purpose processor may identify which operations to forward to the DSP processor in the course of executing operating system code. For example, an application-level process, being executed by the general-purpose processor, may be used to determine which operations to forward to the DSP processor. As another example, a kernel-level process may be used to determine which operations to forward to the DSP processor. In general, in one embodiment, to say that the general-purpose processor performs a particular action (such as forwarding an operation or executing the operation) means that the general-purpose processor executes instructions to perform that action.

In one embodiment, while operations are being processed, a determination is made whether a processor has failed to execute an operation (Operation 206). For example, the general-purpose processor may determine that an operation forwarded to the DSP processor has failed, based on failing to receive a response from the DSP processor within a predetermined maximum time period. If an operation has not failed (for example, if a response to a forwarded operation has been duly received from the DSP processor), then the processors continue processing operations (Operation 208). In one embodiment, the failure of an operation indicates that a processor has failed, i.e., is no longer be functioning as expected. For example, if operations forwarded to a DSP processor begin to fail, then the DSP processor may no longer be reliable for those types of operations. The failure may be a hardware failure, or may be caused by a firmware or operating system state that would be cleared by restarting the DSP processor.

In one embodiment, if a processor has failed to execute an operation, then system recovery may be needed. In a system with one or more physical, movable components, system recovery may involve stopping a component's motor (Operation 210). Stopping a component's motor may be helpful, for example, if the operations executed by the DSP processor relate to servomechanism functionality, in which case the failure of an operation may mean that a component's physical state is no longer known. If the component is accelerating and/or moving into occupied space on a rail, failure to stop the motor may result in physical damage due to overheating, a collision, etc.

In one embodiment, one or more components are reinitialized (Operation 212). Reinitializing a component may involve returning the component to an initial physical location (e.g., a particular position on a rail). Reinitializing a component may involve first stopping the component's motor, as described above, and then applying a signal to the component to return it to the initial position. A component may be reinitialized individually, or the entire system may be reinitialized (e.g., rebooted). To reinitialize the component, the component's controller may send a message to the module manager, which is also aware of other components in the system. The module manager may then transmit the appropriate instructions to reinitialize the component back to the controller. The module manager may also transmit instructions to other controllers, to reinitialize other components. In one embodiment, reinitializing a component helps ensure that the component's physical location is again known, with certainty, after an operation fails.

In one embodiment, based one processor failing, the other processor is configured to execute both types of operations (Operation 214). That is, the other processor is used as a failover processor for operations that were previously executed by the failed processor. The other processor then continues processing operations without the failed processor (Operation 216). For example, if a DSP processor fails to execute an operation, the general-purpose processor may stop forwarding operations to the DSP processor. Instead, the general-purpose processor may execute those operations using its general-purpose instruction set. As an example, a software library may be used to perform floating-point operations, if the general-purpose instruction set does not natively support floating-point operations. Using the general-purpose processor to execute these operations may or may not be less efficient than forwarding the operations to the DSP processor and may even have implications for system performance. For example, moving a component may involve applying electrical signals at particular intervals. Latency and/or other overhead in the operating system being executed by the general-purpose processor may result in missed intervals, thereby resulting in motion control problems. Nonetheless, using the general-purpose processor as a failover processor may allow for the system to continue operating until the failed processor is addressed. For example, while the general-purpose processor keeps the system operational (albeit perhaps not as efficient), a notification may be sent to a system administrator indicating that the DSP processor has failed.

In an embodiment, the system determines that the failed processor is available again (Operation 218). If the processors have been restarted, the determination may be implicit, based on a default operating state. Alternatively, the determination may be based on information received by the general-purpose processor indicating that the DSP processor has been replaced or otherwise recovered. In one embodiment, when the system is restarted, the general-purpose processor is started before the DSP processor. The general-purpose processor transmits one or more signals to the idle DSP processor, to start the DSP processor. While the DSP processor is initializing, the general-purpose processor and the DSP processor transmit a series of signals to each other. Based on these signals, the general-purpose processor determines whether the DSP processor has initialized successfully and is available for use again. Once the failed processor is determined to be available again, processing resumes with different types of operations being executed by the different processors (Operation 220).

4. Illustrative Example

Figure 3:
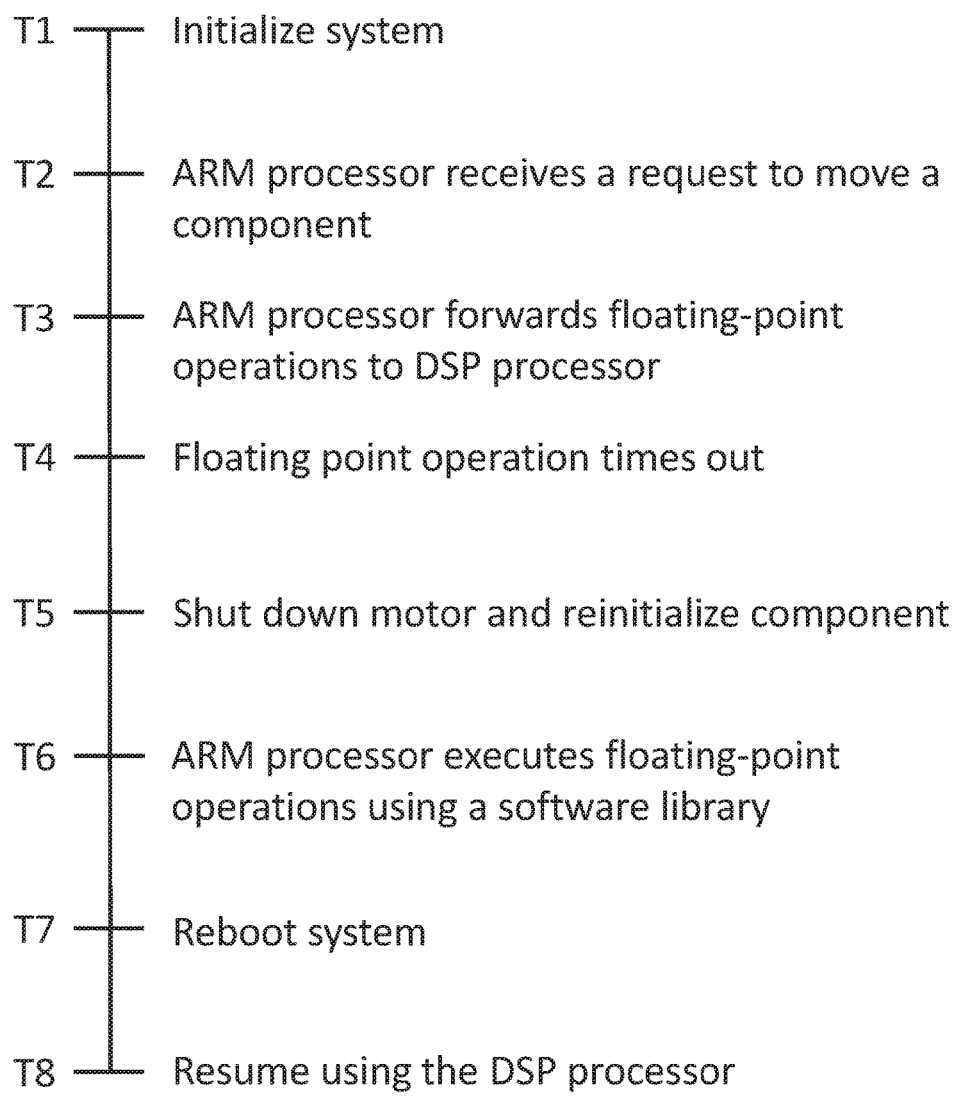
FIG. 3 illustrates an example of a sequence of operations for system recovery using a failover processor in accordance with one embodiment.

FIG. 3 illustrates an example of a sequence of operations for system recovery using a failover processor in accordance with one embodiment. This example is provided for illustrative purposes only, and embodiments should not be construed as limited by this example.

As illustrated in FIG. 3, a timeline of events proceeds from top to bottom, with different times marked as T1, T2, etc. and corresponding descriptions alongside each time marking. At time T1, a system is initialized. For example, a tape library system may be brought online. At time T2, a general-purpose ARM processor receives a request to move a component in the system (e.g., a robot arm along a rail). The request involves some floating-point operations. For example the operations may be in connection with servo-mechanism handling. At time T3, the ARM processor forwards the floating-point operations to the DSP processor. However, at time T4, the ARM determines that a floating-point operation has timed out, i.e., a response has not been received from the DSP processor. At time T5, the ARM applies signals to shut down the component's motor and reinitialize the component. At time T6, the ARM processor then proceeds to execute floating-point operations, which it previously would have forwarded to the DSP processor, using a software library. At time T7, the system is rebooted, which may clear an erroneous operating condition in the DSP processor that led to the failed operation. At time T8, when the system is back online and the DSP processor is in a functioning state, the ARM resumes using the DSP processor for floating-point operations.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
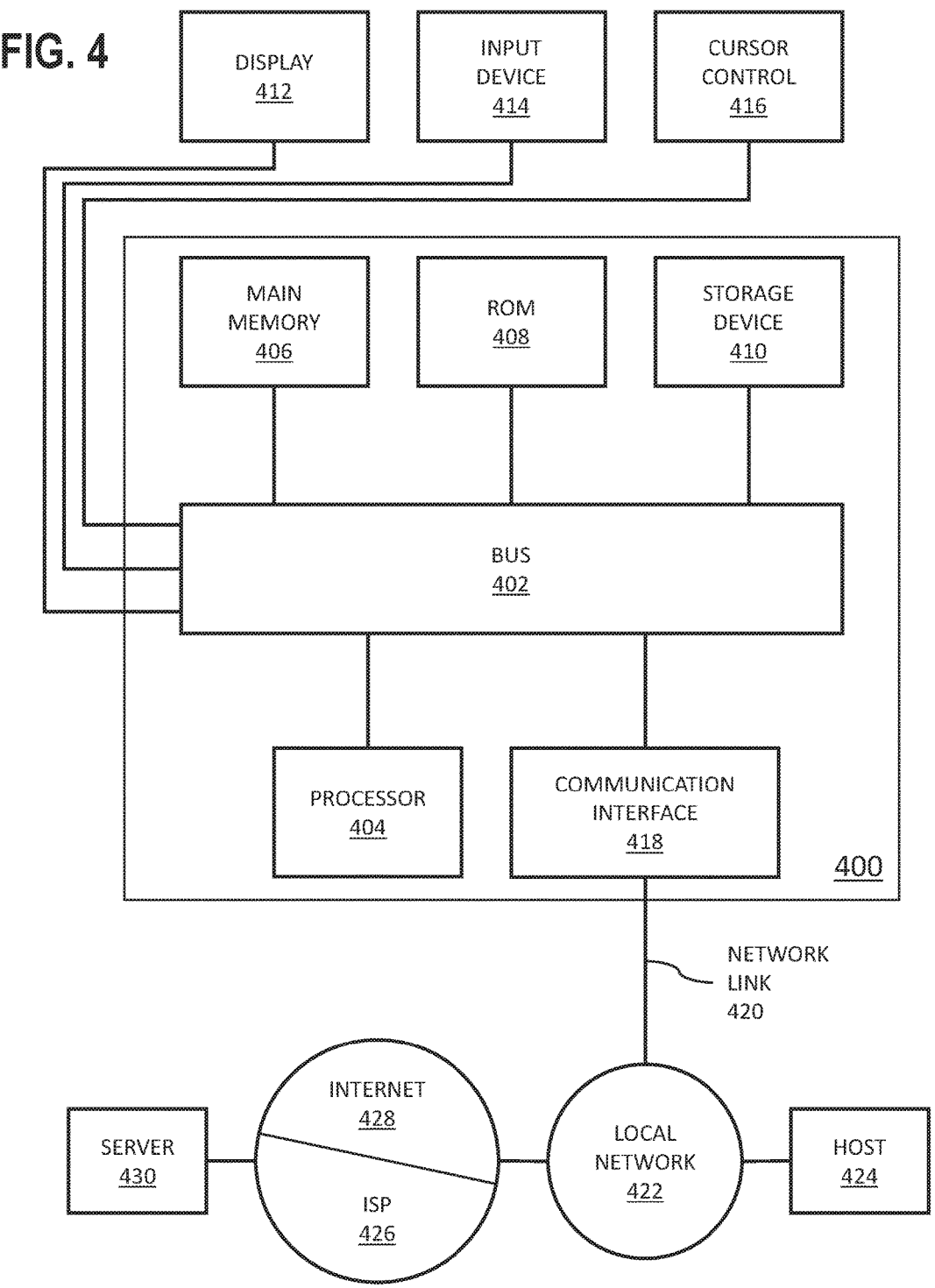
FIG. 4 shows a block diagram illustrating a computer system in accordance with one embodiment.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 318 coupled to bus 402. Communication interface 318 provides a two-way data communication coupling to a network link 420 that is connected to a local network 422. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 318, which carry the digital data to and from computer system 400, are example forms of transmission media.

Computer system 400 can send messages and receive data, including program code, through the network(s), network link 420 and communication interface 318. In the Internet example, a server 430 might transmit a requested code for an application program through Internet 428, ISP 426, local network 422 and communication interface 318.

The received code may be executed by processor 404 as it is received, and/or stored in storage device 410, or other non-volatile storage for later execution.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media string instructions which, when executed by one or more processors, cause:
   configuring a first processor, with a first instruction set, to execute operations of a first type;
   configuring a second processor, with a second instruction set different from the first instruction set, to execute operations of a second type,
   wherein the first processor is a general-purpose processor, the second processor is a digital signal processing (DSP) processor, and operations of the second type comprise floating point operations;
   determining that the second processor has failed to execute at least one operation of the second type within a particular period of time; and
   responsive to determining that the second processor has failed to execute at least one operation of the second type within the particular period of time: configuring the first processor to execute the operations of the first type and the operations of the second type.

2. The one or more media of claim 1, wherein configuring the second processor to execute operations of the second type comprises:
   configuring the first processor for forwarding operations of the second type to the second processor for execution.

3. The one or more media of claim 2, wherein configuring the first processor to execute the operations of the second type comprises re-configuring the first processor from
   (a) forwarding operations of the second type to the second processor for execution, to
   (b) executing the operations of the second type using a software library to perform operations that are part of the second instruction set.

4. The one or more media of claim 1, wherein determining that the second processor has failed comprises:
   forwarding, by the first processor, operations of the second type to the second processor; and
   determining, by the first processor, that the second processor has not responded within the particular period of time.

5. The one or more media of claim 1, further storing instructions which, when executed by one or more processors, cause:
   continuing to use the first processor to execute operations of the second type until a system comprising the first processor and the second processor is restarted; and
   upon restarting the system, resuming use of the second processor to execute operations of the second type.

6. The one or more media of claim 1, further storing instructions which, when executed by one or more processors, cause:
   configuring the first processor to receive requests corresponding to operations of the first type and operations of the second type;
   determining, by the first processor, that operations of the second type are to be processed by the second processor; and
   forwarding requests corresponding to operations of the second type to the second processor, based on determining that the operations of the second type are to be processed by the second processor.

7. One or more non-transitory machine-readable media storing instructions which, when executed by one or more processors, cause:
configuring a first processor, with a first instruction set, to execute operations of a first type;
configuring a second processor, with a second instruction set different from the first instruction set, to execute operations of a second type,
wherein the first processor and the second processor are used to control a mechanical component;
determining that the second processor has failed to execute at least one operation of the second type within a particular period of time;
responsive to determining that the second processor has failed to execute at least one operation of the second type within the particular period of time:
configuring the first processor to execute the operations of the first type and the operations of the second type,
stopping operation of a motor of the mechanical component,
reinitializing the component, and
resuming operation of the motor after configuring the first processor to execute the operations of the second type.

8. A system comprising:
at least one device including a hardware processor;
the system being configured to perform operations comprising:
configuring a first processor, with a first instruction set, to execute operations of a first type;
configuring a second processor, with a second instruction set different from the first instruction set, to execute operations of a second type,
wherein the first processor is a general-purpose processor, the second processor is a digital signal processing (DSP) processor, and operations of the second type comprise floating point operations;
determining that the second processor has failed to execute at least one operation of the second type within a particular period of time; and
responsive to determining that the second processor has failed to execute at least one operation of the second type within the particular period of time: configuring the first processor to execute the operations of the first type and the operations of the second type.

9. The system of claim 8, wherein configuring the second processor to execute operations of the second type comprises:
configuring the first processor for forwarding operations of the second type to the second processor for execution.

10. The system of claim 9, wherein configuring the first processor to execute the operations of the second type comprises re-configuring the first processor from
(a) forwarding operations of the second type to the second processor for execution, to
(b) executing the operations of the second type using a software library to perform operations that are part of the second instruction set.

11. The system of claim 8, wherein determining that the second processor has failed comprises:
forwarding, by the first processor, operations of the second type to the second processor; and
determining, by the first processor, that the second processor has not responded within the particular period of time.

12. The system of claim 8, wherein the operations further comprise:
continuing to use the first processor to execute operations of the second type until a system comprising the first processor and the second processor is restarted; and
upon restarting the system, resuming use of the second processor to execute operations of the second type.

13. The system of claim 8, wherein the operations further comprise:
configuring the first processor to receive requests corresponding to operations of the first type and operations of the second type;
determining, by the first processor, that operations of the second type are to be processed by the second processor; and
forwarding requests corresponding to operations of the second type to the second processor, based on determining that the operations of the second type are to be processed by the second processor.

14. A system comprising:
at least one device including a hardware processor;
the system being configured to perform operations comprising:
configuring a first processor, with a first instruction set, to execute operations of a first type;
configuring a second processor, with a second instruction set different from the first instruction set, to execute operations of a second type,
wherein the first processor and the second processor are used to control a mechanical component;
determining that the second processor has failed to execute at least one operation of the second type within a particular period of time;
responsive to determining that the second processor has failed to execute at least one operation of the second type within the particular period of time:
configuring the first processor to execute the operations of the first type and the operations of the second type,
stopping operation of a motor of the mechanical component,
reinitializing the component, and
resuming operation of the motor after configuring the first processor to execute the operations of the second type.

15. A method comprising:
configuring a first processor, with a first instruction set, to execute operations of a first type;
configuring a second processor, with a second instruction set different from the first instruction set, to execute operations of a second type,
wherein the first processor is a general-purpose processor, the second processor is a digital signal processing (DSP) processor, and operations of the second type comprise floating point operations;
determining that the second processor has failed to execute at least one operation of the second type within a particular period of time; and
responsive to determining that the second processor has failed to execute at least one operation of the second type within the particular period of time: configuring the first processor to execute the operations of the first type and the operations of the second type,
wherein the method is performed by at least one device comprising a hardware processor.

16. The method of claim 15, wherein configuring the second processor to execute operations of the second type comprises:

configuring the first processor for forwarding operations of the second type to the second processor for execution.

17. The method of claim 16, wherein configuring the first processor to execute the operations of the second type comprises re-configuring the first processor from
   (a) forwarding operations of the second type to the second processor for execution, to
   (b) executing the operations of the second type using a software library to perform operations that are part of the second instruction set.

18. A method comprising:
   configuring a first processor, with a first instruction set, to execute operations of a first type;
   configuring a second processor, with a second instruction set different from the first instruction set, to execute operations of a second type,
   wherein the first processor and the second processor are used to control a mechanical component;
   determining that the second processor has failed to execute at least one operation of the second type within a particular period of time;
   responsive to determining that the second processor has failed to execute at least one operation of the second type within the particular period of time:
      configuring the first processor to execute the operations of the first type and the operations of the second type,
      stopping operation of a motor of the mechanical component,
      reinitializing the component, and
      resuming operation of the motor after configuring the first processor to execute the operations of the second type,
   wherein the method is performed by at least one device comprising a hardware processor.

* * * * *

UNITED STATES PATENT AND TRADEMARK OFFICE
CERTIFICATE OF CORRECTION

| | |
|---|---|
| PATENT NO. | : 10,474,549 B2 |
| APPLICATION NO. | : 15/665343 |
| DATED | : November 12, 2019 |
| INVENTOR(S) | : West et al. |

Page 1 of 1

It is certified that error appears in the above-identified patent and that said Letters Patent is hereby corrected as shown below:

In the Claims

In Column 16, Line 7, in Claim 1, delete "string" and insert -- storing --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*